(12) United States Patent
Uchida et al.

(10) Patent No.: US 11,841,069 B2
(45) Date of Patent: Dec. 12, 2023

(54) POWER TRANSMISSION DEVICE

(71) Applicant: MUSASHI SEIMITSU INDUSTRY CO., LTD., Toyohashi (JP)

(72) Inventors: Akihiro Uchida, Toyohashi (JP); Akuto Sekiguchi, Toyohashi (JP); Tetsuya Okabe, Toyohashi (JP)

(73) Assignee: Musashi Selmitsu Industry Co., Ltd., Aichi (JP)

( * ) Notice: Subject to any disclaimer, the term of this patent is extended or adjusted under 35 U.S.C. 154(b) by 0 days.

(21) Appl. No.: 17/617,162

(22) PCT Filed: Jun. 26, 2020

(86) PCT No.: PCT/JP2020/025282
§ 371 (c)(1),
(2) Date: Dec. 7, 2021

(87) PCT Pub. No.: WO2020/262626
PCT Pub. Date: Dec. 30, 2020

(65) Prior Publication Data
US 2022/0260147 A1 Aug. 18, 2022

(30) Foreign Application Priority Data
Jun. 28, 2019 (JP) .................................. 2019-122190

(51) Int. Cl.
F16H 48/40 (2012.01)
F16H 48/08 (2006.01)
F16H 48/38 (2012.01)

(52) U.S. Cl.
CPC ............ *F16H 48/40* (2013.01); *F16H 48/08* (2013.01); *F16H 2048/385* (2013.01)

(58) Field of Classification Search
CPC ..................................................... F16H 55/17
See application file for complete search history.

(56) References Cited

U.S. PATENT DOCUMENTS 9,239,104 B2   1/2016  Uchida et al.
10,125,855 B2  11/2018 Yanase
(Continued)

FOREIGN PATENT DOCUMENTS

CN   106015509 A  10/2016
JP      5234185 B2   7/2013
(Continued)

OTHER PUBLICATIONS

Office Action, Notice of Reasons for Refusal, dated Apr. 5, 2023, issued in the corresponding Japanese Patent Application No. 2019-122190, and the English translation thereof.

(Continued)

*Primary Examiner* — Ernesto A Suarez
*Assistant Examiner* — James J Taylor, II
(74) *Attorney, Agent, or Firm* — Carrier, Shende & Associates P.C.; Joseph P. Carrier; Jeffrey T. Gedeon

(57) ABSTRACT

A power transmission device has a hub portion of a ring gear is fixed by a weld portion to a flange portion on an outer periphery of a transmission member, an annular groove that is recessed in the inner side of the axial direction is formed in a side face of the hub portion for making axial positions of the annular groove and the cavity part partially coincide with each other, the hub portion is narrowed partway along a part sandwiched between the cavity part and weld portion and the annular groove when viewed in a cross section transecting the annular groove, and a narrowed portion is set to have a thickness that alleviates residual stress produced around the weld portion of the flange portion by the force with which the flange portion and the hub portion pull each other in response to thermal shrinkage of the weld portion.

2 Claims, 4 Drawing Sheets

(56) References Cited

U.S. PATENT DOCUMENTS

2012/0295125 A1    11/2012   Uchida et al.
2013/0195545 A1     8/2013   Tsuchida et al.
2016/0290466 A1*  10/2016   Yanase .................... F16H 48/40
2022/0196131 A1*   6/2022   Ono ........................ F16H 57/08

FOREIGN PATENT DOCUMENTS

| JP | 2016-188657 A | | 11/2016 | |
| KR | 20100078382 A | * | 7/2010 | ............. F16H 48/00 |
| WO | 2012/039014 A1 | | 3/2012 | |
| WO | 2017/050375 A1 | | 3/2017 | |

OTHER PUBLICATIONS

First Office Action dated Sep. 16, 2023 issued in the corresponding Chinese Patent Application No. 202080045855.X with the English machine translation thereof.

* cited by examiner

COMPARATIVE EXAMPLE

POWER TRANSMISSION DEVICE

TECHNICAL FIELD

The present invention relates to a power transmission device, and in particular to a power transmission device that includes a transmission member that has a radially outward facing flange portion on an outer periphery thereof and is rotatable, and a ring gear that has on an inner periphery thereof a hub portion surrounding the flange portion, an outer peripheral face of the flange portion having at least a first outer peripheral part that extends further inward in an axial direction than a side face, on one side in the axial direction, of the flange portion and having fitted and welded thereto an inner peripheral face of the hub portion, and a second outer peripheral part that is adjacent to an axially inner end of the first outer peripheral part, a cavity part being formed between mutually opposing faces of the second outer peripheral part and the inner peripheral face of the hub portion, an axially inner end of a weld portion between the first outer peripheral part and the hub portion facing the cavity part, and the cavity part being made wider at least outward in a radial direction than the weld portion.

In the present invention and the present specification, the 'axial direction' means a direction along the rotational axis (in the embodiment a first axis) of a transmission member, and in particular 'further inward than a side face in the axial direction' means, with reference to the side face, inward in the axial direction, that is, the thickness direction, of a flange portion having the side face. Furthermore, the 'radial direction' means the direction of a radius whose central axis is the rotational axis of a transmission member.

BACKGROUND ART

The power transmission device is already known, as disclosed in for example Patent Document 1 below.

PRIOR ART DOCUMENTS

Patent Documents

Patent Document 1: Japanese Patent Application Laid-open No. 2016-188657

SUMMARY OF THE INVENTION

Problems to be Solved by the Invention

In the power transmission device, that is, a differential device, of Patent Document 1, a weld portion between a first outer peripheral part of a flange portion of the transmission member, that is, the differential case, and a hub portion of a ring gear undergoes thermal expansion at the time of welding, and then undergoes thermal shrinkage after being welded, thus subjecting parts, sandwiching the weld portion, of the flange portion and the hub portion to a large tensile force in a direction in which they move closer to each other in the radial direction. In this case, since the ring gear, including the hub portion, is formed so as to have high rigidity overall and tries to maintain its original annular shape, the weld portion and a portion, around the weld part, of the flange portion are pulled strongly toward the hub portion side, and there is a tendency for a relatively high residual stress to be produced in the portion.

FIG. 4 shows one example of a residual stress distribution determined by computer simulation analysis for a Comparative Example of the same type as that of the above differential device. In this figure, a pale grey part denotes an area where residual stress occurs, and the darker the tone, the larger the residual stress.

The present invention has been accomplished in light of the above circumstances, and it is an object thereof to provide a power transmission device that can alleviate the residual stress with a simple structure.

Means for Solving the Problems

In order to attain the above object, according to a first aspect of the present invention, there is provided a power transmission device comprising a transmission member that has a radially outward facing flange portion on an outer periphery thereof and is rotatable, and a ring gear that has on an inner periphery thereof a hub portion surrounding the flange portion, an outer peripheral face of the flange portion having at least a first outer peripheral part that extends further inward in an axial direction than a side face, on one side in the axial direction, of the flange portion and having fitted and welded thereto an inner peripheral face of the hub portion, and a second outer peripheral part that is adjacent to an axially inner end of the first outer peripheral part, an annular cavity part being formed between mutually opposing faces of the second outer peripheral part and the inner peripheral face of the hub portion, an axially inner end of a weld portion between the first outer peripheral part and the hub portion facing the cavity part, and the cavity part extending further at least outward in a radial direction than the weld portion, characterized in that an annular groove is recessed in a side face, on the one side in the axial direction, of the hub portion so as to make axial positions of the annular groove and the cavity part partially coincide with each other, the hub portion is narrowed partway along a part sandwiched between the cavity part and weld portion and the annular groove when viewed in a cross section transecting the annular groove, and a narrowed portion is set to have a thickness that can alleviate residual stress produced around the weld portion of the flange portion by the force with which the flange portion and the hub portion pull each other in response to thermal shrinkage of the weld portion.

Further, according to a second aspect of the present invention, in addition to the first aspect, the narrowed portion has a minimum thickness that is no greater than an axial length of the weld portion.

Furthermore, according to a third aspect of the present invention, in addition to the first or second aspect, the minimum thickness of the narrowed portion is smaller than a maximum width of the cavity part in the radial direction.

Effects of the Invention

In accordance with the first aspect, since the annular groove is recessed in the side face of the hub portion of the ring gear so as to make the axial position of the cavity part partially coincide with the axial position of the annular groove, when viewed in a cross section transecting the annular groove the hub portion is narrowed partway along a portion sandwiched between the annular groove and the cavity part and weld portion, and the narrowed portion is set to have a thickness that can alleviate residual stress produced around the weld portion of the flange portion by the forces of the flange portion and the hub portion pulling each other accompanying thermal shrinkage of the weld portion, it is possible to appropriately weaken the rigidity in the vicinity of the weld portion of the hub portion due to the narrowed portion being specially provided, and it is possible to alleviate residual stress produced around the weld portion of the flange portion due to thermal shrinkage of the weld portion. It is thereby possible to prevent effectively the occurrence of delayed fracture of the transmission member due to high residual stress in the flange portion.

In accordance with the second aspect, since the minimum thickness of the narrowed portion does not exceed the axial length of the weld portion, the narrowed portion does not become excessively thick in relation to the weld portion, and it is possible to more reliably achieve the desired effect.

In accordance with the third aspect, since the minimum thickness of the narrowed portion is smaller than the maximum width of the cavity part in the radial direction (or the axial direction), the narrowed portion does not become excessively thick in relation to the cavity part, and it is possible to more reliably achieve the desired effect.

EXPLANATION OF REFERENCE NUMERALS AND SYMBOLS

Figure 1:
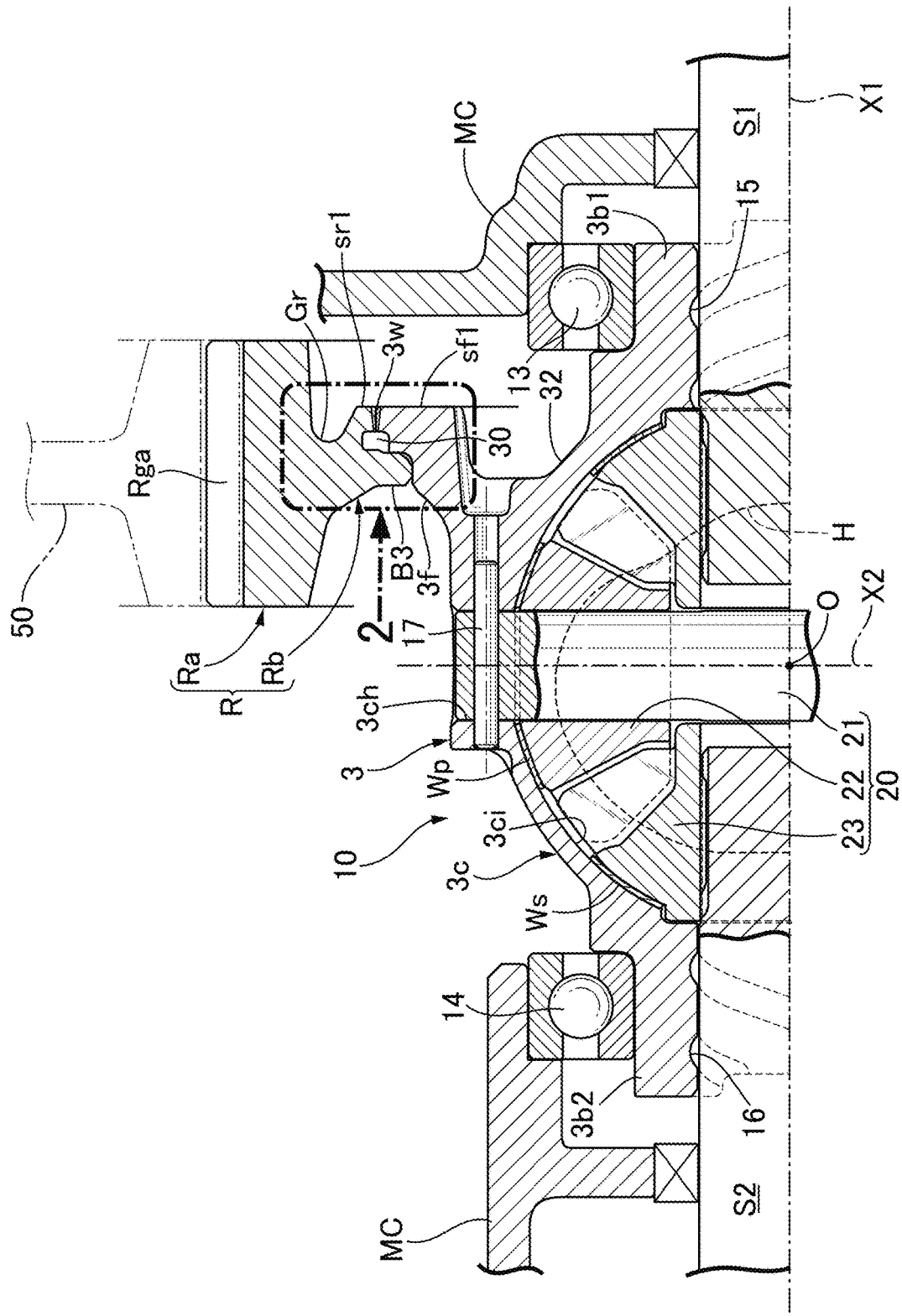
FIG. 1 is a sectional view of an essential part showing a differential device related to one embodiment of the present invention.

A1, A2 First and second outer peripheral parts
Gr Annular groove
R Ring gear
Rb Hub portion
Rbk Narrowed portion
sf1 First side face as side face on one side in the axial direction of flange portion
sr1 First side face as side face on one side in the axial direction of hub portion
$t_{MIN}$ Minimum thickness of narrowed portion
tw Axial length of weld portion
$tr_{MAX}$ Maximum width in radial direction of cavity part
3 Differential case as transmission member
3f Flange portion
3w Weld portion
10 Differential device as power transmission device
30 Cavity part

MODES FOR CARRYING OUT THE INVENTION

An embodiment of the present invention is explained below by reference to the attached drawings.

First, in FIG. 1, housed within a transmission case MC of a vehicle (for example, an automobile) is a differential device 10 that distributes and transmits power from a power source (for example, a vehicle-mounted engine), which is not illustrated, between a pair of axles S1, S2 as output shafts. The differential device 10 is one example of a power transmission device and, in the present embodiment, includes a metal differential case 3 and a differential gear mechanism 20 installed in the differential case 3.

The differential case 3 includes a hollow case main body 3c housing the differential gear mechanism 20 in its interior, first and second bearing bosses 3b1, 3b2 connectedly provided integrally with right and left parts of the case main body 3c and arranged on a first axis X1, and an annular flange portion 3f formed integrally with an outer peripheral part of the case main body 3c so as to face radially outward. The case main body 3c is formed into a substantially spherical shape, and an inner face 3ci is formed into a sphere around a center O of the differential case 3.

The first and second bearing bosses 3b1, 3b2 are rotatably supported on the transmission case MC around the first axis X1 via bearings 13, 14 on the outer peripheral sides of the bosses 3b1, 3b2. The left and right axles S1, S2 are rotatably fitted into and supported on inner peripheral faces of the first and second bearing bosses 3b1, 3b2.

Provided in one of mating faces between the bearing bosses 3b1, 3b2 and the axles S1, S2 are helical grooves 15, 16 that can exhibit a screw pump action that feeds lubricating oil within the transmission case MC into the differential case 3 accompanying rotation with respect to the other of the mating faces.

Fixed to the flange portion 3f of the differential case 3 using fixing means that combines welding and press fitting (or fitting) as described later is an inner peripheral part of a ring gear R, that is, a hub portion Rb. The flange portion 3f in the illustrated example is disposed offset toward one side in the axial direction (that is, the first bearing boss 3b1 side) from the center O of the case main body 3c. An annular depression 32 facing toward one side in the axial direction is formed between an outside face of the case main body 3c and the flange portion 3f in the offset direction.

The ring gear R has a short cylindrical rim portion Ra that has a helical gear-shaped tooth portion Rag on its outer periphery and the hub Rb, which is formed so as to be narrower in the axial direction than the rim portion Ra and is connectedly provided integrally with an inner peripheral side of the rim portion Ra, the tooth portion Rag meshing with a drive gear 50 that becomes an output part of a speed change device connected to the power source.

The rotational force from the drive gear 50 is transmitted to the case main body 3c of the differential case 3 via the ring gear R and the flange portion 3f. In FIG. 1, the tooth portion Rag is shown as a cross section along the line of the tooth in order to simplify illustration.

The differential gear mechanism 20 includes a pinion shaft 21 that is disposed on a second axis X2 orthogonal to the first axis X1 at the center O of the case main body 3c and is supported on the case main body 3c, a pair of pinion gears 22, 22 rotatably supported on the pinion shaft 21, and left and right side gears 23, 23 meshing with each pinion gear 22 and capable of rotating around the first axis X1. The two side gears 23, 23 function as output gears of the differential gear mechanism 20, and inner end parts of the left and right axles S1, S2 are spline fitted into inner peripheral faces of the two side gears 23, 23.

Respective back faces of the pinion gears 22 and side gears 23 are rotatably supported on the spherical inner face 3ci of the case main body 3c via a pinion gear washer Wp and a side gear washer Ws respectively (or directly without a washer). At least areas of the inner face 3ci of the case main body 3c that become a pinion gear support face and a side gear support face are machined by a machining device such as a lathe through a working window H, which is described later, after casting of the differential case 3.

The pinion shaft 21 is inserted through and retained by a pair of pinion shaft support holes 3ch formed in an outer peripheral end part of the case main body 3c and extending on the second axis X2. Attached by insertion (for example, press fitted) into the case main body 3c is a retaining pin 17 that extends so as to transect one end part of the pinion shaft 21. The retaining pin 17 prevents the pinion shaft 21 from disengaging from the pinion shaft support hole 3ch.

The rotational force transmitted from the drive gear 50 to the case main body 3c of the differential case 3 via the ring gear R is distributed and transmitted to the pair of axles S1, S2 via the differential gear mechanism 20 while allowing differential rotation. Since the differential function of the differential gear mechanism 20 is conventionally well known, explanation thereof is omitted.

As shown by a dotted line in FIG. 1, the differential case 3 has a pair of the working windows H in a side wall of the case main body 3c further toward the other side in the axial direction (that is, second bearing boss 3b2 side) than the flange portion 3f. The pair of working windows H are disposed and formed symmetrically on opposite sides of a virtual plane including the first and second axes X1, X2. Each working window H is a window for allowing machining of the inner face 3ci of the case main body 3c or assembly of the differential gear mechanism 20 into the case main body 3c, and is formed into a shape that is sufficiently large for its purpose.

One example of a structure for fixing the hub portion Rb of the ring gear R to the flange portion 3f of the differential case 3 is now explained by reference in addition to FIG. 2.

The outer peripheral face of the flange portion 3f includes a first outer peripheral part A1 that extends further inward in the axial direction than a first side face sf1 on one side in the axial direction (that is, the first bearing boss 3b1 side) of the flange portion 3f and to which is fitted and welded a welded portion B1 of the inner periphery of the hub portion Rb, and a second outer peripheral part A2 that is adjacent to the axially inner end of the first outer peripheral part A1. An annular cavity part 30 having a rectangular cross section is formed between mutually opposing faces of the second outer peripheral part A2 and a cavity-forming part B2 that is recessed in the inner periphery of the hub portion Rb. The fitting between the first outer peripheral part A1 and the welded portion B1 prior to welding may be light press fitting or fitting without play.

The axially inner end of a weld portion 3w between the first outer peripheral part A1 and the hub portion Rb (more specifically the welded portion B1) faces the cavity part 30. The cavity part 30 is formed so as to extend at least further outward in the radial direction than the weld portion 3w (in the embodiment also further inward). The cavity part 30 can be utilized as degassing means that smoothly discharges gas produced in the weld portion 3w to the outside. The second outer peripheral part A2 in the illustrated example is stepped down inwardly in the radial direction from the first outer peripheral part A1 but may be continuous so as to be flush with the first outer peripheral part A1.

An outer peripheral face of the flange portion 3f has a positioning outer peripheral part A3 further toward the other side in the axial direction (that is, the second bearing boss 3b2 side) than the cavity part 30, and the positioning outer peripheral part A3 is formed as a shape that is stepped down inwardly in the radial direction from the axially inner end of the second outer peripheral part A2. Engaged with the positioning outer peripheral part A3 is a positioning projecting part B3 that is provided on the inner periphery of the hub portion Rb so as to project inward in the radial direction. Due to the engagement the hub portion Rb is positioned both in the radial and axial directions with respect to the flange portion 3f.

In order to carry out the positioning the positioning outer peripheral part A3 has a radial direction positioning face A3r that has an inner peripheral face B3i of the positioning projecting part B3 press fitted thereto in the axial direction so as to position the hub portion Rb in the radial direction with respect to the flange portion 3f, and an axial direction positioning face A3a that has a side face B3s, on the first outer peripheral part A1 side, of the positioning projecting part B3 abutted thereagainst so as to position the hub portion Rb in the axial direction with respect to the flange portion 3f. Instead of the radial direction positioning face A3r and the inner peripheral face B3i of the positioning projecting part B3 being press fitted as described above, they may be fitted without play.

The axial direction positioning face A3a extends inward in the radial direction from the axially inner end of the second outer peripheral part A2 on a virtual plane orthogonal to the first axis X1. A radially inner end part of the axial direction positioning face A3a is smoothly continuous from the radial direction positioning face A3r via a round face. The radial direction positioning face A3r is formed as a cylindrical face around the first axis X1 and is continuous from a second side face sf2 on the other side in the axial direction (that is, the second bearing boss 3b2 side) of the flange portion 3f.

A chamfered face is provided on each of opposite end parts in the axial direction of the inner peripheral face B3i of the positioning projecting part B3, and a cavity is formed between each chamfered face and the positioning outer peripheral part A3.

An annular groove Gr that concentrically surrounds the weld portion 3w is recessed in a first side face sr1 on the one side in the axial direction (that is, the first bearing boss 3b1 side) of the hub portion Rb so that the axial position of the annular groove Gr and the axial position of the cavity part 30 are made to partially coincide with each other (and therefore sufficiently deeply).

Figure 2:
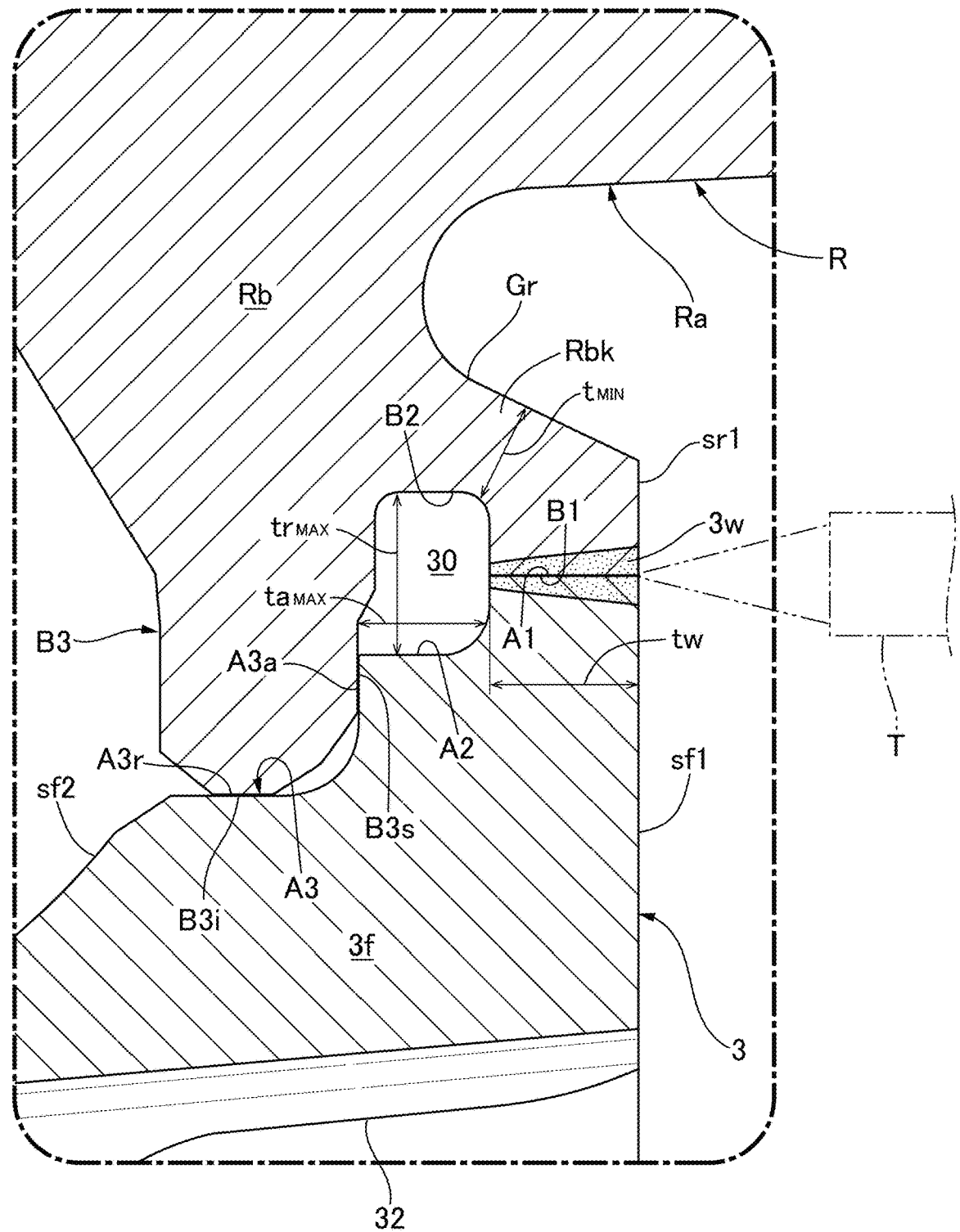
FIG. 2 is an enlarged sectional view of part 2 in FIG. 1.

Moreover, as is clearly shown in FIG. 2 in particular, the hub portion Rb is narrowed partway along a portion sandwiched between the annular groove Gr and the cavity part 30 and weld portion 3w when viewed in a cross section transecting the annular groove Gr (in other words, a cross section including the first axis X1). The narrowed portion Rbk is set to have a thickness that can alleviate residual stress in the weld portion 3w and a part of the flange portion 3f around the weld portion 3w produced by a tensile force between the flange portion 3f and the hub portion Rb accompanying thermal shrinkage of the weld portion 3w.

More specifically speaking, for example, a minimum thickness $t_{MIN}$ of the narrowed portion Rbk is set to be no greater than an axial length tw of the weld portion 3w, and to be smaller than maximum widths $tr_{MAX}$, $ta_{MAX}$ in the radial and axial directions of the cavity part 30.

The operation of the first embodiment is now explained.

The differential case 3 is cast from a metal material (for example, aluminum, aluminum alloy, cast iron, etc.), and after being cast a predetermined area (for example, the inner face 3ci of the case main body 3c, inner and outer peripheries within the bearing bosses 3b1, 3b2, the flange portion 3f, the pinion shaft support hole 3ch, etc.) of an inner face or an outer face of the differential case 3 is subjected to machining processing.

Each element of the differential gear mechanism 20 is assembled through the working window H into the differential case 3, for which the machining processing has been completed, and an inner peripheral part of the hub portion Rb of the ring gear R, on which the tooth portion Rag has been formed in advance, is joined to the flange portion 3f of the differential case 3 by the use of press fitting and welding in combination.

The process of joining the ring gear R is now explained. First, the welded portion B1 of the hub portion Rb of the ring gear R is fitted onto the first outer peripheral part A1 of the flange portion 3f, at the same time the inner peripheral face B3i of the positioning projecting part B3 of the hub portion Rb is press fitted onto the radial direction positioning face A3r of the third outer peripheral part A3, and the inside face B3s of the positioning projecting part B3 is abutted against the axial direction positioning face A3a of the third outer peripheral part A3. Positioning of the hub portion Rb in both the radial direction and the axial direction with respect to the flange portion 3f is thus carried out.

Subsequently, the fitted part between the welded portion B1 of the hub portion Rb and the first outer peripheral part A1 of the flange portion 3f is welded. This welding process is carried out for example as shown by the chain line in FIG. 2 by irradiating the outer end of the fitted part between the first outer peripheral part A1 of the flange portion 3f and the welded portion B1 of the hub portion Rb with a laser from a welding laser torch T, and the irradiated area is gradually moved to the entire periphery of the outer end of the fitted part.

In this way, the inner peripheral part of the hub portion Rb of the ring gear R is strongly joined to the flange portion 3f of the differential case 3 via a predetermined position using press fitting and welding in combination.

Figure 4:
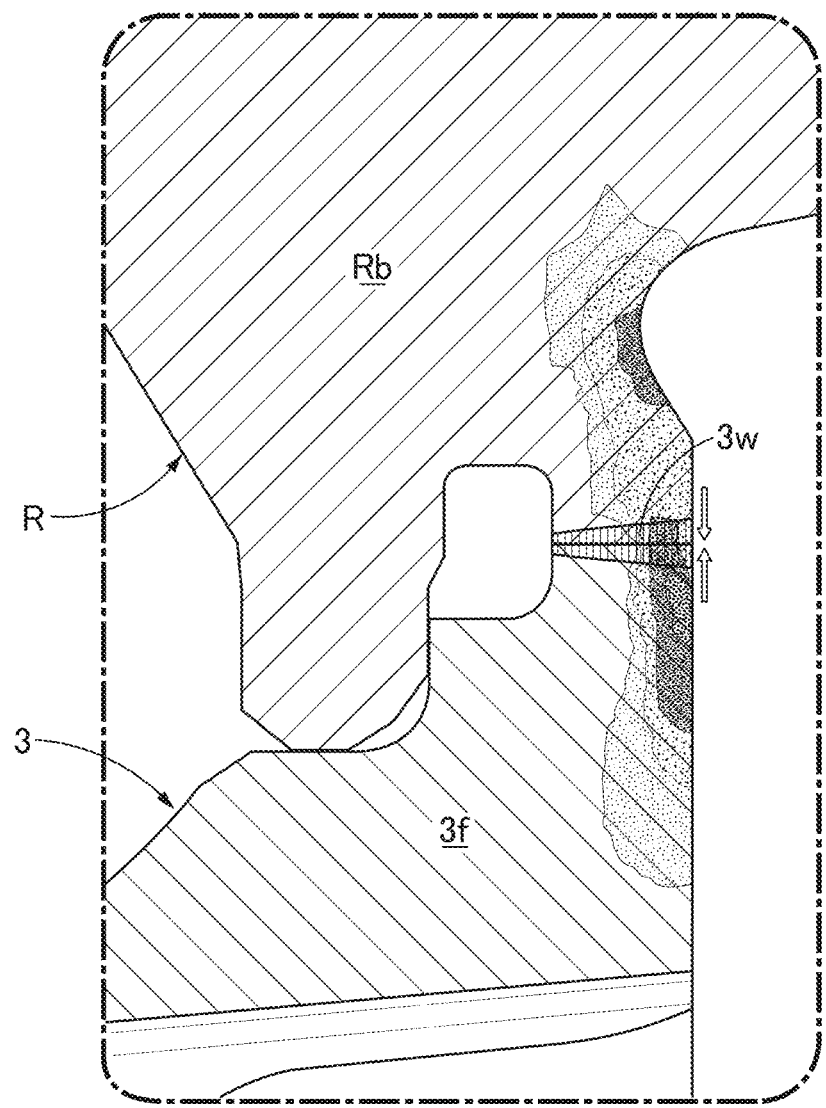
FIG. 4 is a sectional view, corresponding to FIG. 3, showing a Comparative Example.

FIG. 4 shows a comparative example that does not have the technical aspects of the present invention (a deep annular groove Gr and a narrowed portion Rbk). In this arrangement, the weld portion 3w between the flange portion 3f of the differential case 3 as a transmission case (transmission member) and the hub portion Rb of the ring gear R undergoes thermal expansion at the time of welding and then undergoes thermal shrinkage after welding, thereby causing portions, sandwiching the weld portion 3w, of the flange portion 3f and the hub portion Rb to be pulled with a large force in directions in which they move closer to each other in the radial direction as shown by open arrows in FIG. 4.

In this case, the ring gear R, including the hub portion Rb on the inner peripheral side, is formed so as to have a high rigidity overall, it tries to maintain its original annular shape, the weld portion 3w and a part, around the weld portion 3w, of the flange portion 3f in particular are pulled strongly toward the hub portion Rb side, and relatively high residual stress thereby tends to be caused in the portion (see residual stress distribution in FIG. 4).

On the other hand, in accordance with the present embodiment, the annular groove Gr, which is recessed inward in the axial direction, is formed in the side face sr1, on one side in the axial direction (that is, on the side on which the weld portion 3w is exposed), of the hub portion Rb of the ring gear R so that the annular groove Gr is sufficiently deep so as to make the axial position of the cavity part 30 partially coincide with the axial position of the annular groove Gr. Moreover, when viewed in a cross section transecting the annular groove Gr (see FIG. 1 and FIG. 2), the hub portion Rb is narrowed partway along a portion sandwiched between the annular groove Gr and the cavity part 30 and weld portion 3w, and the narrowed portion Rbk is set to have a thickness that can alleviate residual stress produced in the weld portion 3w of the flange portion 3f and a part therearound by the forces of the flange portion 3f and the hub portion Rb pulling each other accompanying thermal shrinkage of the weld portion 3w.

Figure 3:
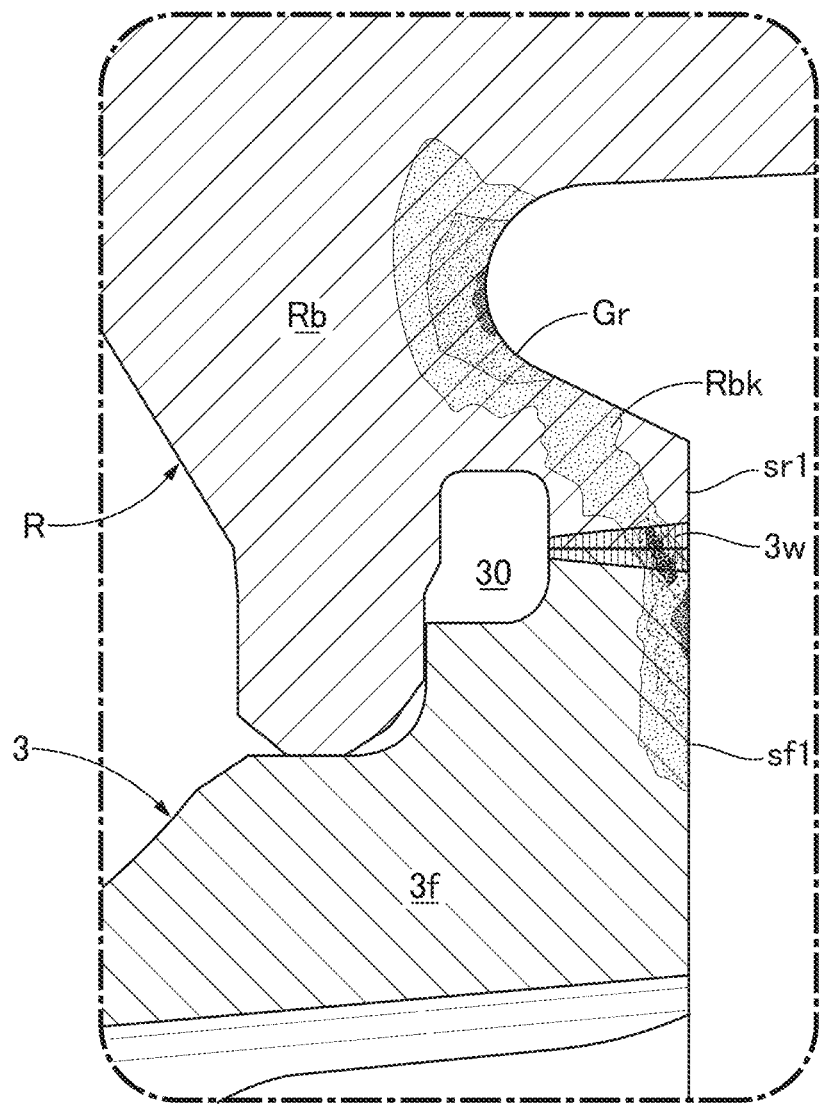
FIG. 3 is a sectional view, corresponding to FIG. 2, showing residual stress distribution of a differential case in a state in which cooling is completed after welding, determined by computer simulation analysis.

Therefore, since the rigidity of the part around the weld portion 3w of the hub portion Hb can be appropriately weakened due to the narrowed portion Rbk being specially provided, as is clear from FIG. 3, it is possible to alleviate residual stress in the weld portion 3w of the flange portion 3f and the part therearound, which is prominent in the comparative example. As a result, it is possible to prevent effectively the occurrence of delayed fracture of the differential case 3 due to high residual stress in the flange portion 3f, and in particular the part around the weld portion 3w.

In particular, since the minimum thickness $t_{MIN}$ of the narrowed portion Rbk of the present embodiment is no greater than the axial length tw of the weld portion 3w, the narrowed portion Rbk does not become excessively thick in relation to the weld portion 3w, that is, the rigidity of the portion around the weld portion 3w of the hub portion Hb can be appropriately weakened. As a result, it becomes possible to reliably alleviate residual stress produced in the weld portion 3w of the flange portion 3f and the part therearound due to thermal shrinkage of the weld portion 3w.

Furthermore, since the minimum thickness $t_{MIN}$ of the narrowed portion Rbk is set to be smaller than the maximum width $tr_{MAX}$ of the cavity part 30 at least in the radial direction (in the illustrated example also the maximum width $ta_{MAX}$ in the axial direction), the narrowed portion Rbk will not become excessively thick in relation to the cavity part 30, that is, the rigidity of the portion around the weld portion 3w of the hub portion Hb is weakened appropriately. As a result, it becomes possible to more reliably alleviate residual stress produced in the weld portion 3w of the flange portion 3f and the part therearound due to thermal shrinkage of the weld portion 3w.

An embodiment of the present invention is explained above, but the present invention is not limited to the embodiment and may be modified in a variety of ways as long as the modifications do not depart from the subject matter.

For example, the embodiment illustrates a case in which the differential device 10 as a power transmission device is implemented as a vehicle differential device, in particular a differential device between left and right driven wheels, but in the present invention the differential device 10 may be implemented as a differential device between front and rear driven wheels or may be implemented as a differential device in various types of machines and devices other than vehicles.

Furthermore, the present invention may be applied to a power transmission device other than a differential device (for example, a speed reduction device, a speed increase device, a speed change device, etc.), and in this case a rotating case or a rotating member serving to transmit torque of the power transmission device becomes the transmission case or the transmission member.

Moreover, the embodiment illustrates a case in which the tooth portion Rag of the ring gear R is a helical gear, but the ring gear of the present invention may be another gear having a tooth shape that receives a thrust load in a direction along the first axis X1 due to meshing with the drive gear 50 (for example, a bevel gear, a hypoid gear, etc.). Alternatively, it may be a gear having a tooth shape that does not receive the thrust load due to meshing with the drive gear 50 (for example, a spur gear).

Furthermore, the embodiment illustrates a case in which the hub portion Rb of the ring gear R having the tooth portion Rag formed in advance is joined to the flange portion 3f of the differential case 3, but the ring gear R may be joined to the hub portion Rb prior to the tooth portion Rag being formed, and after that the tooth portion Rag may be formed.

Moreover, the embodiment illustrates a case in which welding between the flange portion 3f and the hub portion Rb employs laser welding, but in the present invention another welding method (for example, electron beam welding, etc.) may be used.

The invention claimed is:

1. A power transmission device comprising a transmission member that has a radially outward facing flange portion on an outer periphery thereof and is rotatable, and a ring gear that has on an inner periphery thereof a hub portion surrounding the flange portion, an outer peripheral face of the flange portion having at least a first outer peripheral part that extends further inward in an axial direction than a side face, on one side in the axial direction, of the flange portion and that has fitted and welded thereto an inner peripheral face of the hub portion, and a second outer peripheral part that is adjacent to an axially inner end of the first outer peripheral part, an annular cavity part being formed between mutually opposing faces of the second outer peripheral part and the inner peripheral face of the hub portion, an axially inner end of a weld portion between the first outer peripheral part and the hub portion facing the cavity part, and the cavity part extending further at least outward in a radial direction than the weld portion, wherein an annular groove is recessed in a side face, on said one side in the axial direction, of the hub portion so as to make axial positions of the annular groove and the cavity part partially coincide with each other, the hub portion is narrowed partway along a part sandwiched between the cavity part and the weld portion and the annular groove when viewed in a cross section transecting the annular groove, and a narrowed portion is set to have a thickness that can alleviate residual stress produced around the weld portion of the flange portion by the force with which the flange portion and the hub portion pull each other in response to thermal shrinkage of the weld portion, and the narrowed portion has a minimum thickness that is no greater than an axial length of the weld portion.

2. The power transmission device according to claim 1, wherein the minimum thickness of the narrowed portion is smaller than a maximum width of the cavity part in the radial direction.

* * * * *